United States Patent Office 2,727,010
Patented Dec. 13, 1955

2,727,010
REACTIVATION OF TITANIUM-PHOSPHORUS CATALYSTS

Wilford J. Zimmerschied, Crown Point, Ind., assignor to Standard Oil Company, Chicago, Ill., a corporation of Indiana No Drawing. Application December 1, 1952, Serial No. 323,519

7 Claims. (Cl. 252—411)

The present invention relates to catalysts for the conversion of hydrocarbons. More particularly, it relates to a catalyst prepared by interaction of a titanium halide and a phosphoric acid, and to the regeneration thereof after deactivation.

A recent development in the hydrocarbon-conversion art is an improved catalyst, prepared by commingling a titanium halide with a phosphoric acid and heating the mixture under conditions to liberate hydrogen halide therefrom in an amount approaching the theoretically derivable quantity. A gray, friable solid is obtained thereby of high selectivity and of long life in the promotion of a wide variety of hydrocarbon-conversion reactions. Ordinarily, the new catalyst exhibits little or no tendency to promote side reactions such as gas formation and carbon deposition; it tends therefore to retain its original activity over a long period of time. Under certain reaction conditions, however, and especially in treating certain charging stocks, the catalyst becomes deactivated more or less rapidly, and must ultimately be either discarded or subjected to some form of regeneration. For example, when high temperatures around 270° C. or above are used for polymerizing olefins such as propylene, the catalyst gradually decreases in activity. As another example, the desulfurization of West Texas virgin gas oil drastically reduces the catalyst activity.

I have now discovered that the activity of such catalysts deactivated in these and similar ways can be restored by heating the said catalysts at a temperature around 350 to 500° C. under a hydrogen pressure of 500 pounds per square inch or more for a period of about 0.5 hour or longer. In a preferred embodiment, the reactivation is effected by heating a spent catalyst of the defined type at a temperature around 400° C. under a hydrogen pressure between about 500 and 2000 pounds per square inch for a period of 0.5 to 24 hours, optimally about 18 hours. The treatment may be carried out with pure hydrogen or with a hydrogen-containing gas such as ammonia-synthesis gas or hydroformer recycle gas.

One object of my invention is to improve the conversion of hydrocarbons. Another object is to regenerate and revivify hydrocarbon-conversion catalysts. A further object is to restore titanium-phosphorus catalysts for hydrocarbon conversion to an activity approximating the original level. An additional object is to remove deactivating substances from titanium-phosphorus catalysts. Other objects of my invention will be apparent from the present description and the appended claims.

Titanium-phosphorus catalysts of the type susceptible to regeneration by my new process are prepared by reacting a titanium chloride or bromide with a polyhydroxy phosphoric acid, optionally with an oxide of a group V or group VI metal as a promoter. The titanium halide is commingled in a stirred vessel with the phosphoric acid and any added promoter, and the mixture is warmed to a temperature sufficiently high to bring about a steady but controlled evolution of hydrogen halide. The desired reaction usually begins when the reactants are mixed at ordinary temperatures, and the evolution of hydrogen halide proceeds rapidly at 60 to 100° C. As the reaction slows down, the temperature is raised to 175° C. or somewhat higher, preferably between about 175 and 250° C., optimally 200° C., where it is maintained until the evolution of hydrogen halide has practically ceased and the original yellow color of the mixture has changed to gray. Inadequate heating produces a yellow, inactive catalyst, which, however, can be converted into a gray, highly active material by a supplemental heating under the defined conditions. The most active catalysts are obtained at about 96 percent or more of the theoretical hydrogen halide evolution.

The catalyst can satisfactorily be prepared from titanium tetrabromide, titanium tetrachloride, or other titanium bromides or chlorides, the tetrachloride being preferred. Suitable acids are pyrophosphoric acid or orthophosphoric acid, $H_3PO_4$, the latter being preferred. Suitable promoters include the oxides of group V and group VI metals having hydrogenation-dehydrogenation properties, such as chromia, molybdena, vanadia, urania, tungsten oxide, and the like, or substances such as chromic acid, ammonium molybdate, vanadic acid, or the like which afford such oxides under the conditions employed for the catalyst preparation. The group VI metal oxides are preferred. The proportion of promoter oxide, when used, should be between about 0.5 and 20 percent by weight, preferably between about 1 and 5 percent by weight, based on anhydrous phosphoric acid. The proportion of titanium halide to phosphoric acid should be at least about 0.4:1, expressed as atoms of halogen per atom of active hydrogen, and optimally less than about 1:1. A supporting material such as kieselguhr, silica, glass, alumina, charcoal, or the like may be used if desired. In the absence of a supporting material, semisolids are obtained when as little as 0.24 mole of $TiCl_4$ is allowed to react with one mole of $H_3PO_4$, while dry solids are obtained at a ratio of 0.38 or more. At ratios higher than about 0.7 mole per mole, the reaction product contains unreacted titanium tetrachloride; such higher ratios are therefore employed only where the presence of the resulting free $TiCl_4$ in the reaction product is not objectionable. The reaction proceeds more readily and gives higher yields if the phosphoric acid is anhydrous or substantially anhydrous—i. e., contains less than about 2.5 percent by weight of water.

The catalysts prepared as described above are useful in a variety of hydrocarbon-conversion reactions. They may, for example, be used under conventional conditions for the polymerization of unsaturated hydrocarbons to form liquids of higher molecular weight, the alkylation of aromatics or isoparaffins with olefins or olefin-affording substances, the isomerization of paraffins or polyalkyl-substituted aromatics, the side-chain dehydrogenation of alkyl-substituted aromatics, the treatment of motor fuels to increase their antiknock rating, and the like. The oxide-promoted catalysts are especially effective for the desulfurization of sulfur-containing hydrocarbon stocks, for the simultaneous isomerization and dehydrogenation of naphthenes, and the like. In all of these various reactions, the catalysts are exceptionally active and selective, so that high throughputs are ordinarily possible with a minimum of side reactions and catalyst deterioration. Certain charging stocks, however, and aberrant operating conditions tend to reduce the catalyst activity, so that a regeneration treatment at times becomes necessary, and is conveniently carried out according to my technique described hereinabove.

My invention will be more fully understood from the following specific examples:

Example 1

A titanium-phosphorus catalyst was prepared by mixing 1.0 mole of anhydrous $H_3PO_4$ and 0.4 mole of $TiCl_4$ and heating to a temperature around 200° C. until the evolution of HCl had substantially ceased. The resulting solid was formed into ⅛-inch pellets, and 45 milliliters of the pellets were placed into a tubular flow reactor. The reactor was heated to approximately 200° C., and through it was passed a 50:50 mixture of propylene and propane at a pressure of 300 pounds per square inch and a liquid hourly space velocity around 1.2. From the resulting product, liquid polymer was separated in a conversion around 55 percent. A total of 2050 grams of such polymers were made over this catalyst during a study of the effects of the operating variables. Temperatures ranging from 180 to 270° C. were investigated. During the course of the study, the catalyst decreased in activity until finally the conversion to liquid polymer under the standard conditions set forth above had fallen to 7.4 percent. The catalyst was then heated for 18 hours at 400° C. under 1600 pounds per square inch of hydrogen, and was then retested with the 50:50 propylene-propane feed stock. It was observed that the hydrogen treatment had reactivated the catalyst to an activity somewhat higher than the activity of the fresh catalyst. The results are set forth in the following table.

Run A is a typical run under standard conditions.
Run B represents the low point of catalyst activity.
Run C was the first test carried out after hydrogen treatment of the deactivated catalyst.
Run D is a repetition of Run C.

| Run | Temperature, ° C. | Space Velocity, hr.$^{-1}$ | Conversion to Polymer, Percent | Polymer, $n_D^{20}$ |
|---|---|---|---|---|
| A | 200 | 1.2 | 54 | 1.4302 |
| B | 200 | 1.3 | 7.4 | 1.4200 |
| C | 204 | 1.3 | 59.0 | 1.4282 |
| D | 210 | 1.3 | 58.8 | 1.4270 |

*Example 2*

A titanium-phosphorus catalyst was prepared by heating 103.5 grams of orthophosphoric acid and 122 grams of titanium tetrachloride to a temperature ranging from 150 to 200° C. for one hour. The resulting solid was formed into ⅛-inch pellets, and 25 milliliters of the pellets were charged into a flow reactor. The reactor was heated to an elevated temperature, and through it was passed a West Texas virgin heavy naphtha ("WTVHN") containing 0.326 percent sulfur. Three tests were carried out at different pressures (runs E, F, and G), with the results reported below in the table. At 0, 600, and 1000 pounds per square inch hydrogen pressure, the desulfurization was 57, 65, and 70 percent, respectively.

Subsequently, a West Texas virgin gas oil ("WTVGO") containing 1.64 weight-percent sulfur was tested in the absence of hydrogen (run H), and was desulfurized only to the extent of 14 percent.

When the catalyst was thereafter again employed for the desulfurization of West Texas virgin heavy naphtha (runs I and J), the desulfurization was only 6.5 and 37 percent respectively at 0 and 600 pounds per square inch of hydrogen.

The catalyst was then heated for four hours at 400° C. in hydrogen at 1000 pounds per square inch, and was again tested in the desulfurization of West Texas virgin heavy naphtha (run K). A desulfurization of 72 percent was obtained at a hydrogen pressure of 1000 pounds per square inch.

The results were as follows:

| Run | Feed | Sulfur in Feed, wt. percent | H$_2$ Press, lb./in.$^2$ | Temp., ° C. | Space Velocity, hr.$^{-1}$ | Sulfur in Product, wt. percent | Desulfurization, percent |
|---|---|---|---|---|---|---|---|
| E | WTVHN | 0.326 | 0 | 395 | 2 | 0.139 | 57 |
| F | WTVHN | 0.326 | 600 | 359 | 2 | 0.114 | 65 |
| G | WTVHN | 0.355 | 1,000 | 398 | 1.6 | 0.105 | 70 |
| H | WTVGO | 1.64 | 0 | 396 | 2.4 | 1.43 | 14 |
| I | WTVHN | 0.326 | 0 | 396 | 2.3 | 0.305 | 6.5 |
| J | WTVHN | 0.326 | 600 | 396 | 3.7 | 0.205 | 37 |
| K | WTVHN | 0.216 | 1,000 | 402 | 2.1 | 0.06 | 72 |

While the foregoing specific examples illustrate advantageous embodiments of my invention, it is to be understood that I am not limited thereto, but rather that the true scope of my invention is evidenced by the broad disclosure thereof and by the appended claims. In general it can be said that any modifications or equivalents of my invention that would ordinarily occur to one skilled in the art are to be considered as lying within the scope of my invention.

In accordance with the foregoing description, I claim as my invention:

1. A method for restoring the activity of a deactivated titanium-phosphorus catalyst, prepared by heating a titanium halide selected from the group consisting of the titanium chlorides and bromides with a phosphoric acid selected from the group consisting of orthophosphoric and pyrophosphoric acids at a temperature above about 175° C. until the evolution of hydrogen halide therefrom substantially ceases, which comprises contacting said deactivated catalyst with hydrogen at a pressure above about 500 pounds per square inch and a temperature between about 350 and 500° C. for a period in excess of about 0.5 hour.

2. The method of claim 1 wherein said catalyst contains as a promoter an oxide of a metal selected from groups V and VI, said oxide having hydrogenation-dehydrogenation properties.

3. A method for restoring the activity of a deactivated titanium-phosphorus catalyst, prepared by heating titanium tetrachloride with orthophosphoric acid in an atomic ratio of halogen to active hydrogen in said acid between about 0.4:1 and 1:1 at a temperature between about 175 and 250° C. until the evolution of hydrogen chloride therefrom substantially ceases, which method comprises contacting said deactivated catalyst with hydrogen at a pressure above about 500 pounds per square inch and a temperature between about 350 and 500° C. for a period between about 0.5 and 24 hours.

4. A method for restoring the activity of a deactivated titanium-phosphorus catalyst, prepared by heating titanium tetrachloride, orthophosphoric acid, and an oxide of a metal selected from groups V and VI, said oxide having hydrogenation-dehydrogenation properties, at a temperature above about 175° C. until the evolution of hydrogen halide therefrom substantially ceases, which comprises contacting said deactivated catalyst with hydrogen at a pressure between about 500 and 2000 pounds per square inch and a temperature between about 350 and 500° C. for a period between about 0.5 and 24 hours.

5. A method for restoring the activity of a deactivated titanium-phosphorus catalyst, prepared by heating titanium tetrachloride with orthophosphoric acid at a temperature around 200° C. until the evolution of hydrogen chloride therefrom substantially ceases, which comprises contacting said deactivated catalyst with hydrogen at a pressure of about 1600 pounds per square inch and a temperature of about 400° C. for a period of about eighteen hours.

6. A method for restoring the activity of a deactivated titanium-phosphorus catalyst, prepared by heating titanium tetrachloride with orthophosphoric acid in an atomic ratio of halogen to active hydrogen in said acid between about 0.4:1 and 1:1 at a temperature between about 175 and 250° C. until the evolution of hydrogen chloride therefrom substantially ceases, said catalyst having become deactivated by use in desulfurization of a sulfur-containing hydrocarbon oil, which method comprises contacting said deactivated catalyst with hydrogen at a pressure above about 500 pounds per square inch and a temperature between about 350 and 500° C. for a period between about 0.5 and 24 hours.

7. A method for restoring the activity of a deactivated titanium-phosphorus catalyst, prepared by heating titanium tetrachloride with orthophosphoric acid in an atomic ratio of halogen to active hydrogen in said acid between about 0.4:1 and 1:1 at a temperature between about 175 and 250° C. until the evolution of hydrogen chloride therefrom substantially ceases, said catalyst having become deactivated by use in the polymerization of an unsaturated hydrocarbon, which method comprises contacting said deactivated catalyst with hydrogen at a pressure above about 500 pounds per square inch and a temperature between about 350 and 500° C. for a period between about 0.5 and 24 hours.

References Cited in the file of this patent

UNITED STATES PATENTS

| | | |
|---|---|---|
| 2,487,867 | Griffin | Nov. 15, 1949 |
| 2,500,776 | Teter | Mar. 14, 1950 |